US005396231A

United States Patent [19]
Hein

[11] Patent Number: 5,396,231
[45] Date of Patent: Mar. 7, 1995

[54] MODULAR COMMUNICATIONS INTERCONNECTION

[75] Inventor: Carl E. Hein, Cherry Hill, N.J.

[73] Assignee: Martin Marietta Corporation, Moorestown, N.J.

[21] Appl. No.: 16,301

[22] Filed: Feb. 8, 1993

[51] Int. Cl.$^6$ .............................................. H04Q 1/00
[52] U.S. Cl. ........................... 340/825.8; 340/825.790
[58] Field of Search ............... 340/825.8, 825.79, 826; 370/58.1, 60.1; 379/271, 325, 329, 36; 361/778, 805

[56] References Cited

U.S. PATENT DOCUMENTS

| | | | |
|---|---|---|---|
| 3,842,214 | 10/1974 | Altenburger et al. | 340/825.8 |
| 3,851,124 | 11/1974 | Garavalia | 340/825.8 |
| 3,893,082 | 7/1975 | Ryder | 340/825.8 |
| 4,566,007 | 1/1986 | Richards | 340/825.79 |
| 5,123,011 | 6/1992 | Hein et al. | 370/58.1 |

Primary Examiner—Donald J. Yusko
Assistant Examiner—Edwin C. Holloway, III
Attorney, Agent, or Firm—W. H. Meise; S. A. Young

[57] ABSTRACT

A communications system (FIG. 7) couples together a number of entities or communications devices 710 by means of alternating stages (722, 726) of crossbar switches (712, 716) and stages (724, 728) of stride extender coupler circuits, which are preferably in the form of modules (714, 718), together with a final stage (730) of cross-connecting "termination" circuits or modules (720). The system can be expanded in performance capability (FIG. 8) by adding further stages (822, 828) of crossbar switches and stride extender coupling circuits or modules.

3 Claims, 12 Drawing Sheets

MODULAR COMMUNICATIONS INTERCONNECTION

This invention relates to modular arrangements for interconnection of communication entities or devices, such as computer processors or telephones.

BACKGROUND OF THE INVENTION

In parallel computers, a plurality of processors are interconnected in a manner which is adapted for performing a particular computing task. In such parallel computers, and in other systems, it is desirable to be able to quickly switch or change the interconnection configuration. A particular other system might be a telephone system. The telephone system is an example of a blocking network, in which any two entities or terminals may be interconnected, but not all possible interconnections can be made simultaneously.

The practical difficulties of construction of interconnection networks tends to become dominant as the number of devices to be interconnected increases. While a custom-made interconnection can be fabricated for each separate configuration in the context of a parallel processing computer, a separate, custom-made back plane is required for each different configuration. In a telephone context a new system of telephone lines would be required for each different pair of parties who wished to speak together. Many types of interconnection schemes have been proposed for rapid reconfiguration of the network extending between communication devices. While most of these schemes are effective for interconnection of small numbers of communication devices, some of the schemes grow more rapidly than others as the number of devices increases.

Various types of networks, such as common bus, tree, multistage switch network, ring, N-dimensional hypercube, and 2-dimensional mesh, have been proposed for interconnecting communication devices. Crossbar switched systems allow complete interconnectability, but practical considerations limit the number of interconnections in a complete crossbar switch.

Figure 1A:
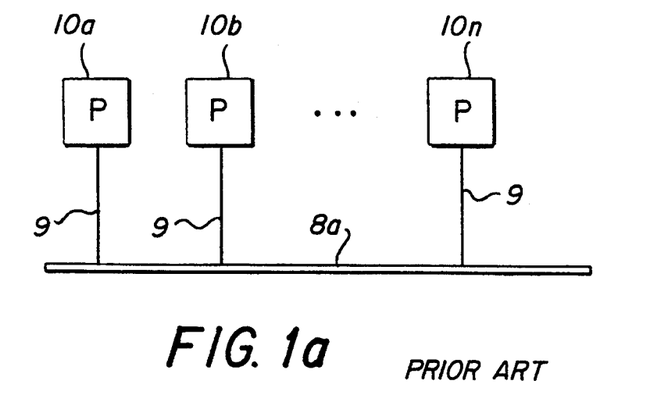
FIG. 1a is a simplified block diagram of a prior-art bus interconnection network for a plurality of communications devices.
Figure 1B:
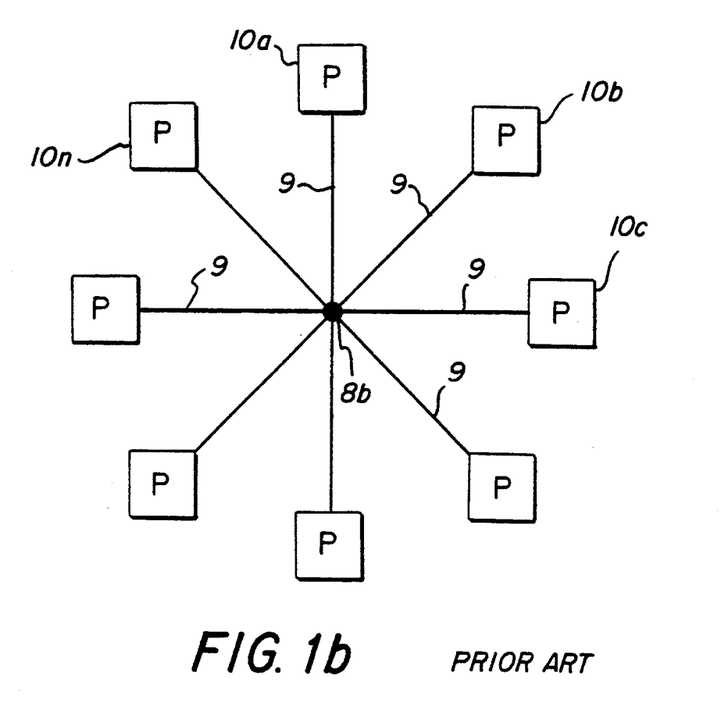
FIG. 1b is its topological equivalent star network.

FIG. 1a illustrates a common bus interconnection arrangement, and FIG. 1b represents a star network, its topological equivalent. These systems are not switched. A common bus 8a, and a common point 10b of FIGS. 1a and 1b, respectively, allow information to be transmitted by a plurality of devices or entities 10a, 10b, 10c . . . 10n, each of which is connected to bus 8 by a data link 9, and received by others of the entities. Each communication device or entity 10 is identified by the letter P, representing a processor. Bus 8a or point 8b must carry all the information, and it can be active 100% of the time. Each device 10 connected to the bus must share the available bus time. Thus, a device can transmit onto the bus only if no other device is transmitting, which requires time-multiplexing. The common-bus arrangement is not satisfactory for systems or processors which must be expandable, or which must have greater capability by virtue of additional devices, because it fails to increase in capability as it is enlarged. An increase of system size by addition of further communication devices 12 reduces the per-device share of the available time. In general, this may be viewed as reducing the bandwidth available to each device. It should be noted that processors 10 of FIGS. 1a and 1b are connected to bus 8 by bidirectional links, and that the connection of a link 9 to a processor 10a or 10b is at a port (not separately designated) which is an input port when the processor receives data and an output port when the processor transmits data. Thus, the nature of the port (input or output) depends on the direction of signal flow.

Figure 2:
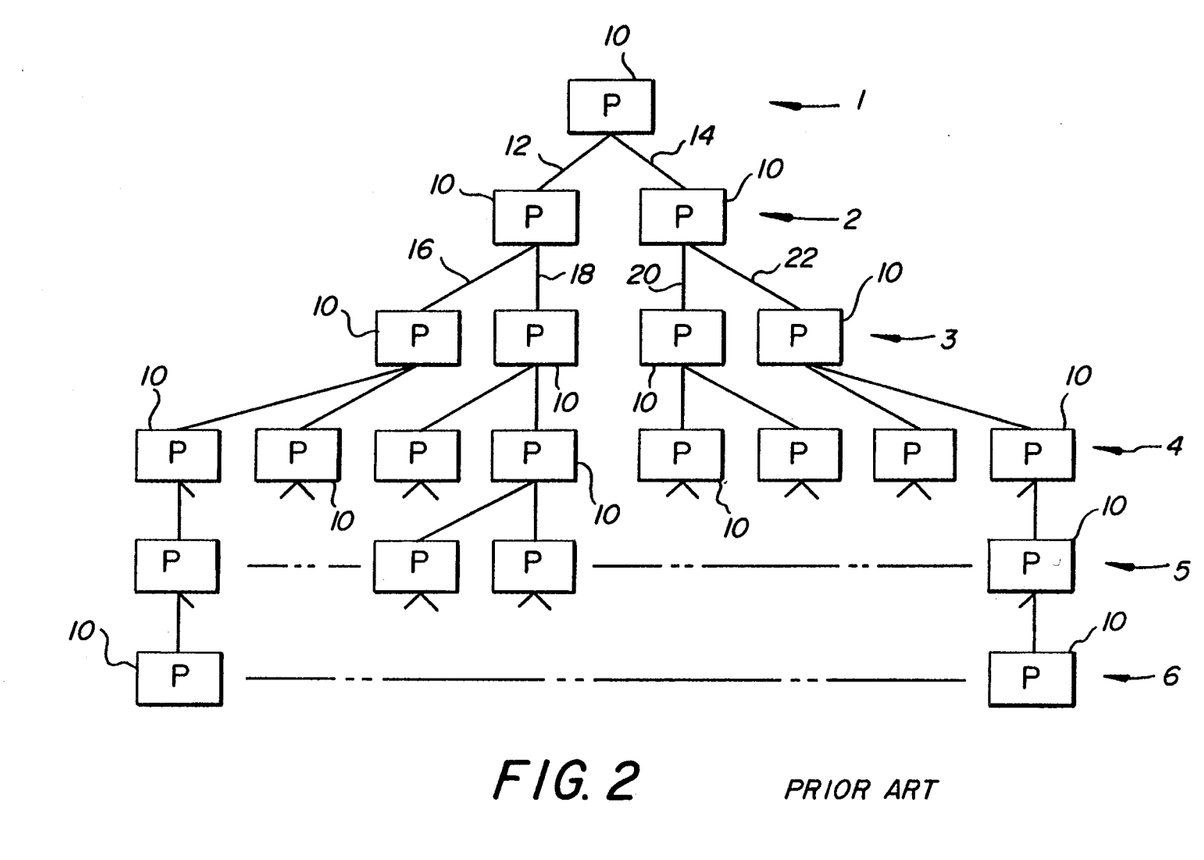
FIG. 2 is a simplified block diagram of a prior-art tree interconnection network.

FIG. 2 represents a tree network, as described, for example, in U.S. Pat. No. 5,123,011, issued Jun. 16, 1992 in the name of Hein et al. Such a system is not switched to change configurations. As described therein, a total of 63 out of 64 processing units (P) 10 are arrayed in tree fashion in ranks numbered 1 to 6. Processor 10 of rank 1 (the "root" node) is connected by two data paths or links 12, 14 to inputs (or outputs, depending upon the direction of flow of signal or information) of two further processors 10 of the second rank. Outputs of the two processors 10 of the second rank are connected by links 16, 18, 20 and 22 to four further processors 10 of the third rank. Rank 4 includes eight processors, rank 5 includes 16 processors, and rank 6 includes 32 processors. As described in the aforementioned Hein et al patent, the inter-processor links may be serial or parallel bit paths. Tree structures may be optimal for specific applications. In many cases, however, the tree structure results in concentrations or "funneling" of traffic volume around the root node. This in turn results in the practical limitation that the network performance may be limited by the bandwidth of the root node, or those nodes near the root node, regardless of the size of the system. In some systems, "expansion" of capability is achieved by increasing the throughput of links near the root node, but this mode of expansion is limited by the available technology.

Figure 3A:
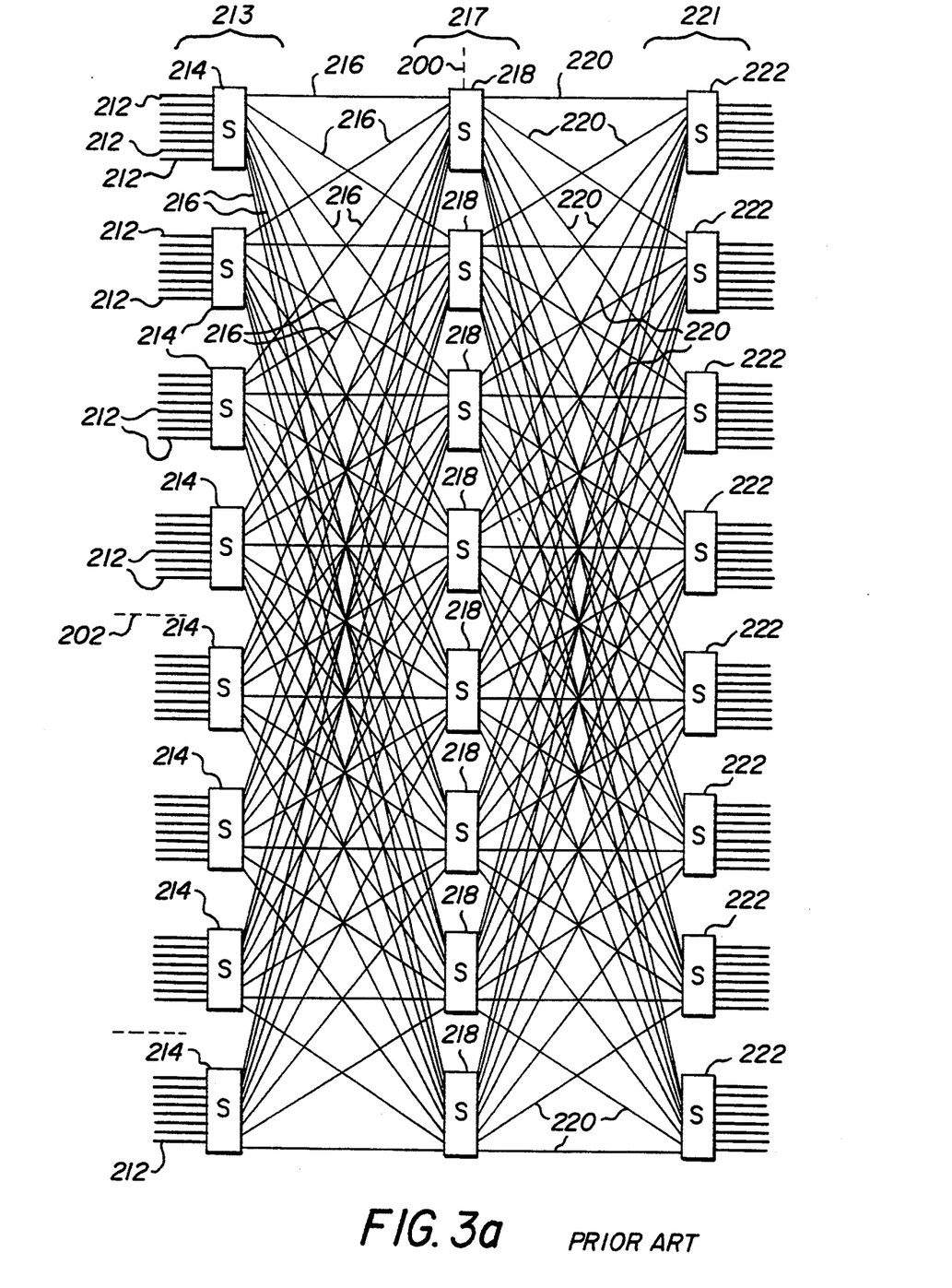
FIG. 3a is a simplified block diagram of a 3-stage prior-art banyan switching network for 8×8 switches.

A conceptually desirable type of interconnection network is the multistage switch network (MSSN), of which the shuffle-exchange based network, Claus, Omega, and banyan are variations. FIG. 3 illustrated a three-stage full banyan network as described in the abovementioned Hein et al patent. In FIG. 3, three stages 213, 217 and 221 of bidirectional crossbar switches (S) are arranged in columns at the left, center and right, respectively. Sixty-four data paths 212 at the left of FIG. 3a are adapted to be connected to the output ports of a corresponding number of processors (not illustrated). Input data paths 212 are grouped into sets of eight, and each set is coupled to the inputs of eight $8 \times 8$ crossbar switches, designated 214, of first stage 213. Each first stage switch 214 accepts eight inputs 212, and can controllably couple any of its input data paths to any of its output data paths. The output data paths of uppermost crossbar switch 214 in FIG. 3a are designated 216. Each of the eight output paths 216 of uppermost crossbar switch 214 is connected to an input data path of a different one of eight $8 \times 8$ crossbar switches 218. Each of the seven other crossbar switches of first stage 216 has one of its output data paths coupled to an input port of one of the crossbar switches 218 of second stage 217. This allows an input signal which is applied to any one of the input stage 216 crossbar switches 214 to reach any crossbar switch 218 of the second stage. The eight output data paths 220 of uppermost crossbar switch 218 of second stage 217 are each coupled to an input port of a different one of crossbar switches 222 of output stage 221. Each of the other seven crossbar switches 218 of second stage 217 has one of its eight output data paths 220 connected to an input port of a different one of the crossbar switches 222 of output stage 221. Since the interconnection structure is symmetrical about an axis of symmetry 200, a signal path can be established between any output port 224 of an output stage 221 crossbar switch 222 and any crossbar switch 218 of second stage 217.

Figure 3B:
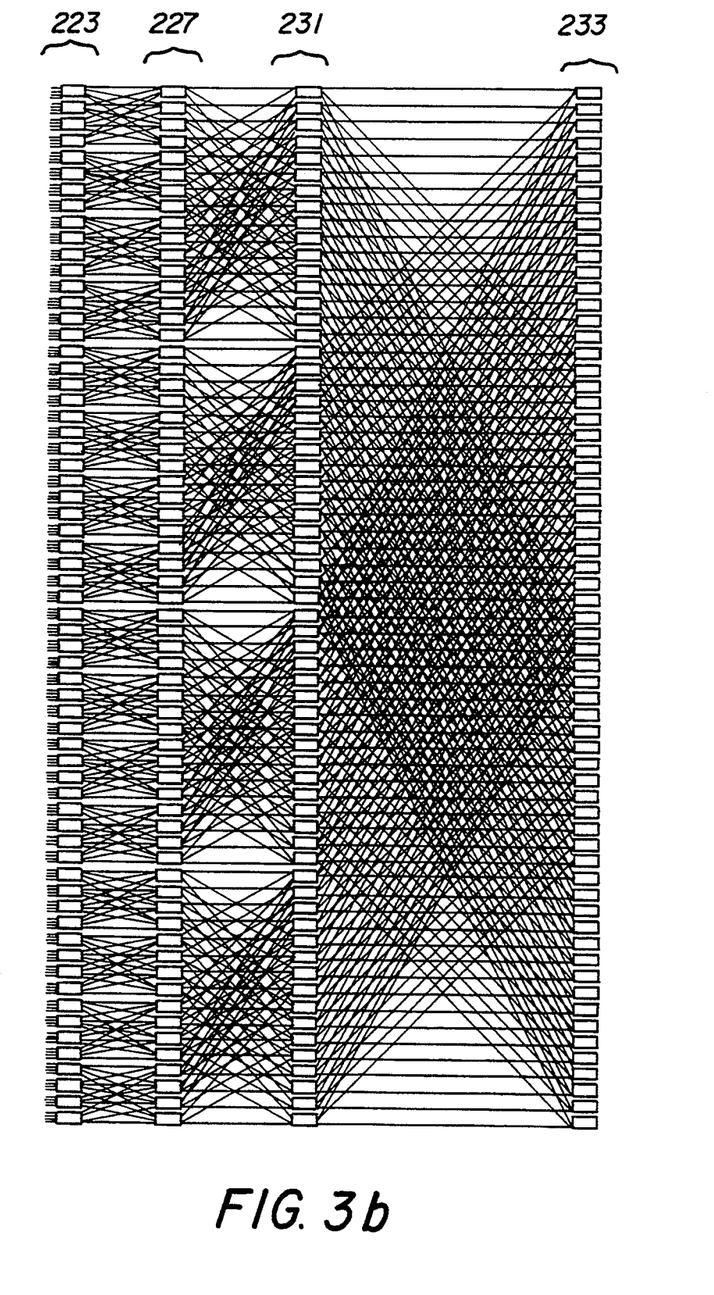
FIG. 3b is a four-stage version for 4×4 switches.

In general, multistage switch networks (MSSNs) provide good performance in most applications, and also tend to require less hardware in terms of linkages and switch nodes. However, MSSNs are not easily expanded due to the apparent irregularity of the link connections for different network sizes. For example, if the network of FIG. 3a were to be reduced to one-half its illustrated size, by cutting and discarding that portion lying below horizontal line of symmetry 202, the connections between stages would clearly have to change, since half the connections would no longer be connected. Also, addition of further stages to an existing network pattern requires different connections, more readily seen in the network of FIG. 3b. In FIG. 3b, the link pattern joining first stage 223 and second stage 227 differs from the link pattern joining second stage 227 and third stage 231, and each differs from the link pattern extending between third stage 231 and fourth stage 233. It appears that the "back-plane" connections, i.e. the link connections, have patterns and repetition dimensions which depend upon both the size of the network and the particular stages being joined. A backplane pattern useful for first to second stage interconnect in FIG. 3a cannot be used in FIG. 3b, nor can the first-to-second, second-to-third, or third-to-fourth stage interconnect patterns of FIG. 3b be interchanged. Consequently, the MSSN pattern, despite its other advantages, requires a custom interconnection for each different size system, and cannot readily be enlarged.

Ring networks, hypercubes, and 2-d mesh networks are generally similar, in that each network switch node corresponds to a network input/output node, which is different from the above described MSSN, in which there may be fewer switch nodes than network ports.

Figure 4:
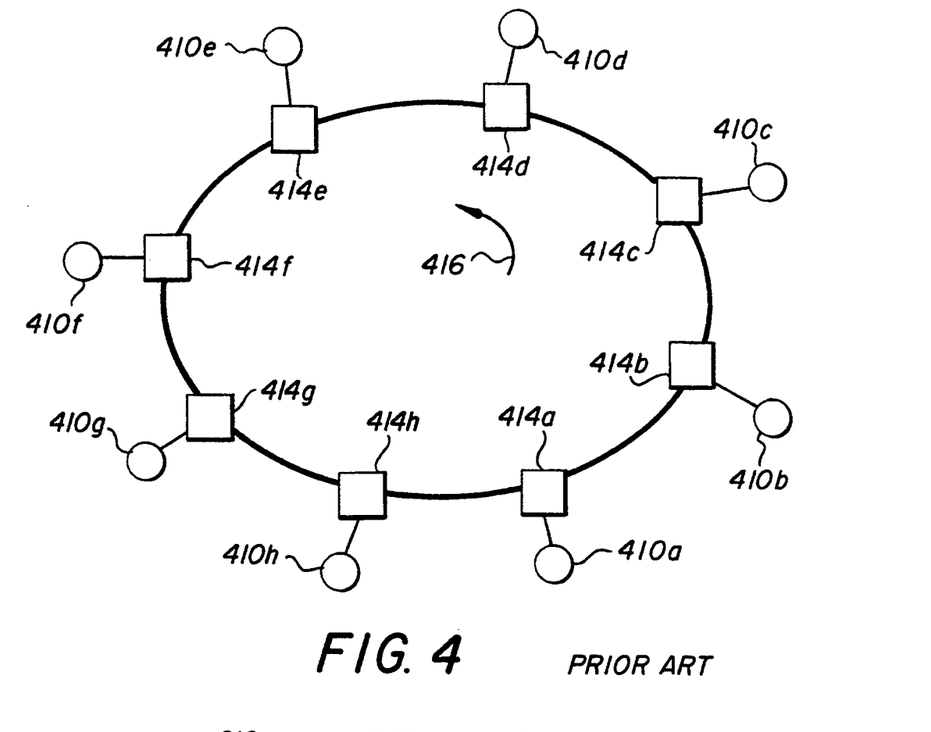
FIG. 4 is a simplified block diagram of a prior-art ring communication network.

FIG. 4 illustrates a ring network, including a plurality of communication devices 410a, 410b, 410c . . . 410h, each of which is connected by a corresponding 3-port switch 414a, 414b, 414c . . . 414h into a closed loop or ring 16. Such an arrangement in effect partitions the bus of FIG. 1a into different portions, which different portions may be used simultaneously for communication between different devices 210. For a uniform communications distribution, about half of the messages must travel less than a quarter of the way around the ring, while the other half must travel more than one-quarter of the way. This means that, on average, each message must consume bandwidth on one-fourth of the available inter-switch links in the network. The total bandwidth of the network, on average, is equal to that of only four links. This surprising result arises, because any single message occupies one-fourth of the total network bandwidth, regardless of the network size. The network can only "carry" four messages at a time, corresponding to four links. Since this is invariant regardless of the network size, the per entity share of bandwidth decreases as additional entities are added. Thus, the ring network is not expandable. An additional disadvantage of the ring network is that, as the network grows, each message must, on average, make more link-hops, as a result of which the latency (delay between initial transmission and reception at the intended receiver) increases. The increase in latency occurs because the switches at each mode assume a state which depends upon the destination of the message, which requires that at least the address portion of the message be decoded.

Figure 5:
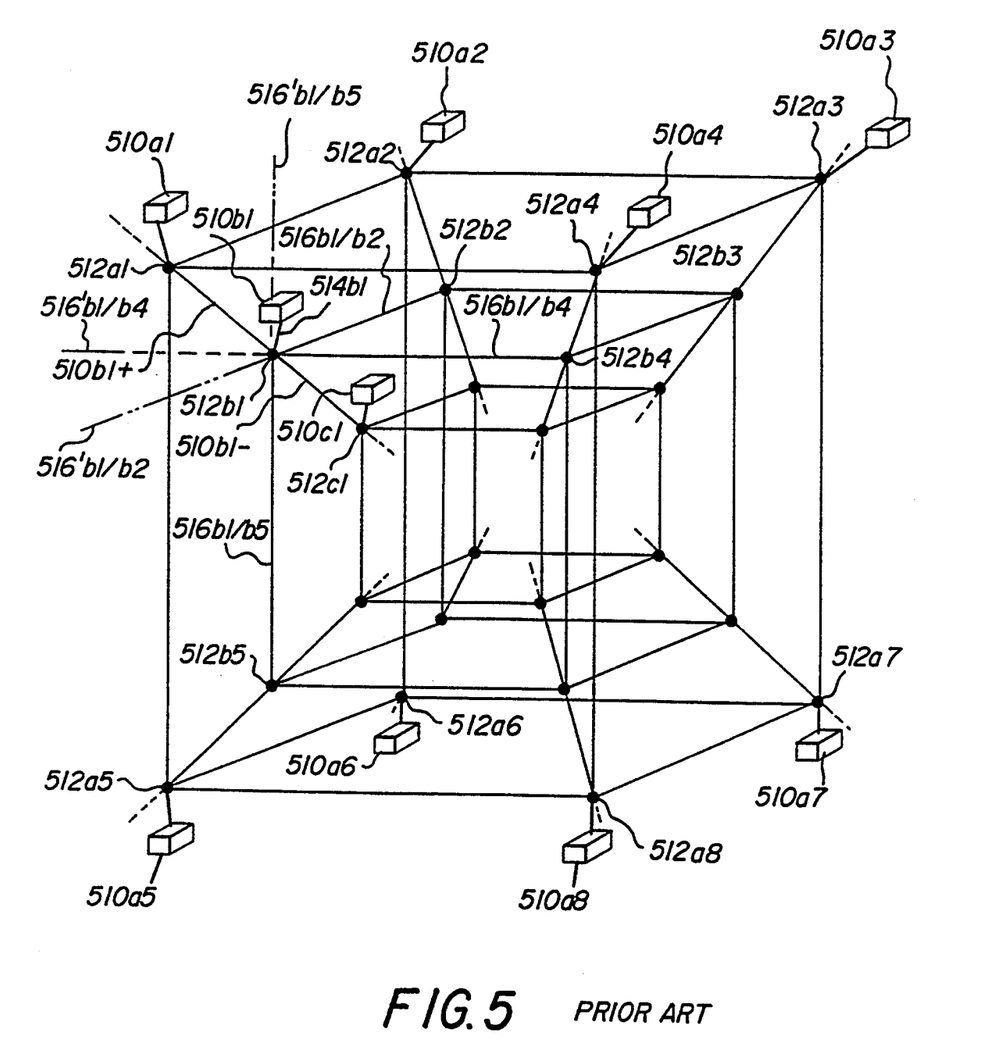
FIG. 5 is a simplified block diagram of a prior art N-dimensional hypercube communications arrangement.

FIG. 5 illustrates an N-dimensional hypercube network, in which N=4. In FIG. 5, each processor (or communication device or entity) 510 is connected by a data link to one port of a corresponding M-port switch 512, where M=9. In such a hypercube, each M-port switch is connected to its own processor and to each immediate neighbor. More particularly, eight processors 410a1, 510a2, . . . 510a8 of FIG. 5 are associated with the vertices of the outermost of the illustrated cubes, and each is connected to a corresponding one of eight nodes 512a1, 512a2, . . . 512a8, each of which represents a six-port switch. Only the front, upper left corner processors 510b1, 510c1 of the center and innermost cubes, respectively, are illustrated, but each vertex or corner of every hypercube is associated with a corresponding processor 510 and a six-port switch 512. The number of ports per switch can be understood by examining the connections of central-cube node 512b1. A first link 514b1 connects a port of switch 512b1 to its associated processor 510b1. Three additional links designated 516b1/b2, 516b1/b4, and 516b1/b5 connect node 512b1 to adjacent nodes 512b2, 512b4, and 512b5 of the same cube. Two additional data links 510b1+ and 510b1− connect node 512b1 to adjacent nodes 512a1 and 512c1, respectively, in the next larger and next smaller cubes. Node 512b1 is also connected to three additional nodes (not illustrated) by extensions of links 516b1/b2, 516b1/b4, and 516b1/b5 designated 515'b1/b2, 516'b1/b4, and 516'b1/b5, which connect to other adjacent structures (not illustrated) equivalent to that illustrated in FIG. 5. Thus, each node or N-port switch is connected to eight adjacent nodes and to the associated processor, for a total of nine data links or switch ports. While a hypercube of dimension 4 has been described, corresponding structures using four and five-sided pyramids are possible. These types of communication network architectures are very effective, but present considerable construction difficulties for moderate or large networks.

Figure 6:
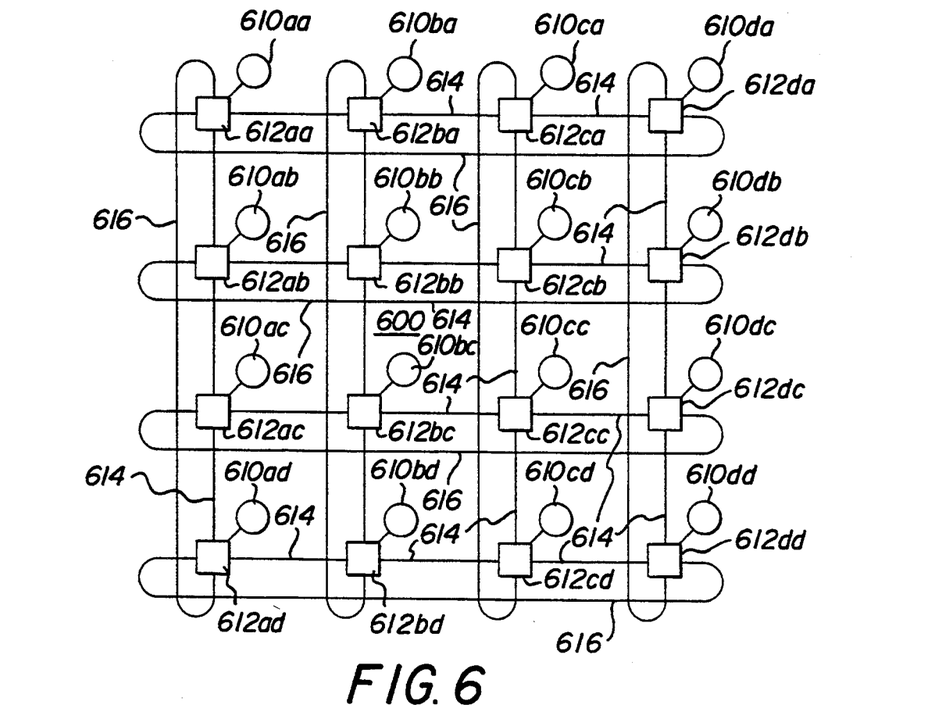
FIG. 6 is a simplified block diagram of a prior art 2-d mesh communications arrangement.

FIG. 6 illustrates a 2-d mesh architecture 600. All the communication devices 610xy, where x represents the column, and y represents the row, and the five-port switches 612x,y of network 600 lie in a plane, and it is therefore termed "two-dimensional" (2-d). One port of each 5-port switch 612x,y is connected to the associated communication device or entity 610xy. The other four ports of each 5-port switch are coupled by links, some of which are designated 614, to the four nearest neighbors. The two-dimensional structure allows straightforward design, layout and expansion of the networks. The average communication latency of a 2-d mesh network can be improved by connecting the edges of the 2-d mesh to the other side, which is accomplished by "toroidal" connections illustrated in FIG. 6 as 616. The toroidal connections 616 do not conform to the equal-length connection links 614 lying in the 2-d plane. These toroidal connections therefore present an implementation challenge which adds complexity to the 2-d mesh communications network.

It appears, from the foregoing considerations, that the 2-d mesh is the most reasonable network to consider for a communications system which must be expandable and realizable at reasonable cost.

Many parallel processing systems are currently available, some of which are described above, but they are not widely applied to the many uses for which they are well adapted. It is widely recognized that the single greatest barrier to usage of parallel processing is the difficulty of efficiently mapping applications onto the parallel system. The programming or mapping task for efficient use of parallel processors is so cumbersome and complex, and therefore time consuming, costly and risky, that few applications have been paralleled. Part of this complexity arises from the dependence of the performance on the match between the processing system's architectural limitations and the application's communication requirements.

SUMMARY OF THE INVENTION

A plurality of crossbar switches in multiple stages are interconnected by an assemblage of mutually identical interconnection sub-circuits, terminated in an assemblage of mutually identical termination sub-circuits, so that only two topologies of sub-circuits are required in addition to the crossbar switches, regardless of how many communication devices or entities are interconnected. The interconnection and termination sub-circuits are preferably modular, so that only two types of modules are required, regardless of how many communication devices or entities are interconnected. A communications system according to the invention can be expanded (or, of course, contracted) by adding (subtracting) communication devices, crossbar switches, and interconnecting modules. Each sub-circuit includes sets of "input" and "output" ports, with the ports of each set in columns and equally spaced in the modular embodiment, so that the "output" ports of one module can be plugged into the "input" ports of the next module. Each subcircuit/module has its input and output ports conceptually arranged in groups of three, with the first input port of one group coupled to the third output port of the preceding group, the second input port of each group coupled to the second output port of the same group, and the third input port of each group coupled to the first output port of the next group. The communications network structure according to the invention when used to implement a parallel processor is more easily programmable than others which have been considered.

DESCRIPTION OF THE DRAWINGS

FIG. 7b is a simplified schematic/layout of a stride extender used in the arrangement of FIG. 7a;

DESCRIPTION OF THE INVENTION

Figure 7A:
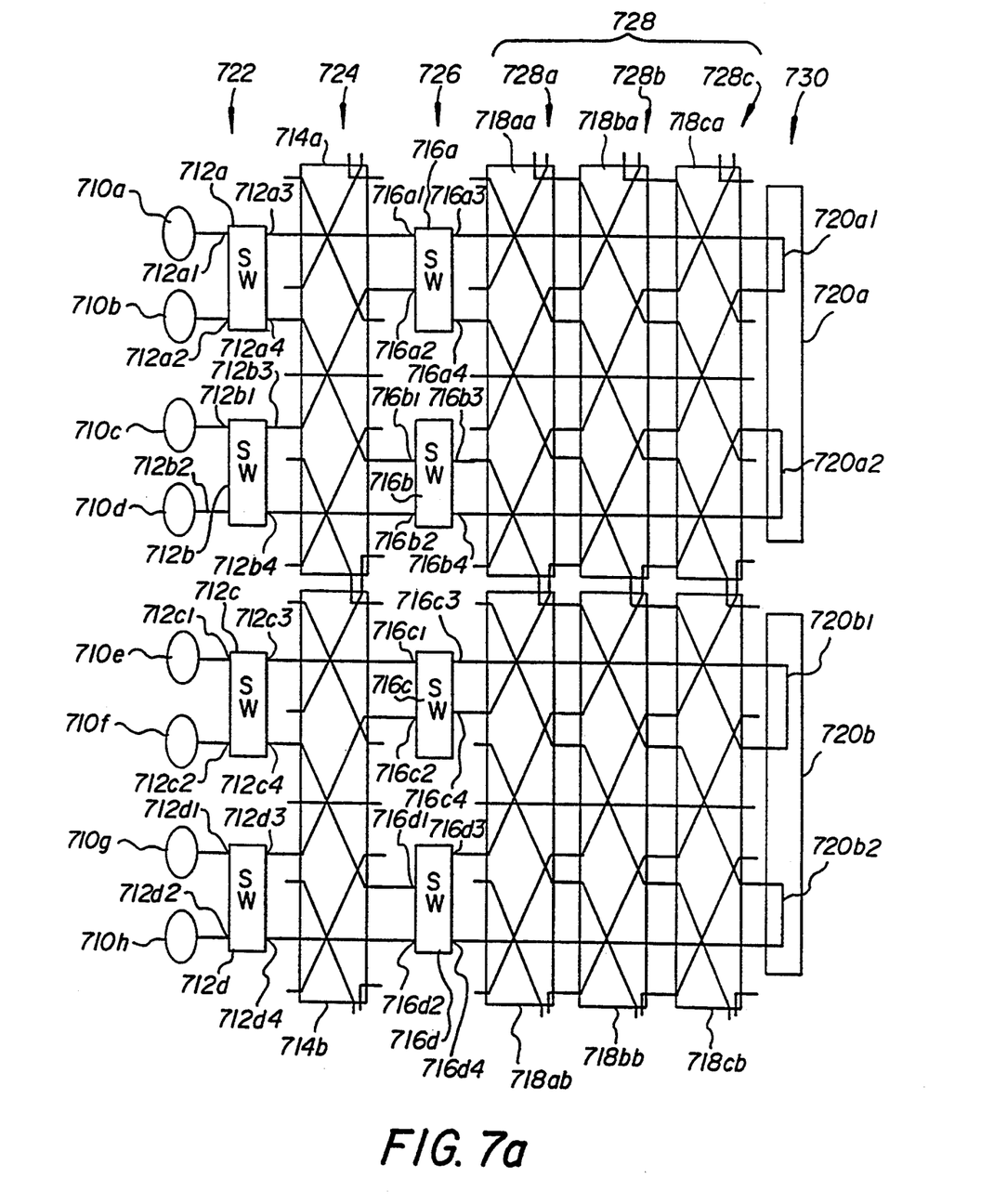
FIG. 7a is a simplified block diagram of a communication system according to the invention, in which a plurality of mutually identical stride extender sub-circuits are cascaded in stages.

In FIG. 7a, eight communications devices or entities 710a–h, where the hyphen represents the word "through", are each connected to a different "input" port of four 2×2 crossbar switches (SW) 712a–d of a first stage 722 of switches. As mentioned, the terms "input" and "output" are for conceptual convenience, as the port are bidirectional, and signal may sometimes flow in "reverse" into some "output" ports and out of some "input" ports, simultaneously with "forward" direction of flow in other parts of the same switch. More specifically, communication device 710a of FIG. 7a is connected to input port 712a1 of switch 712a, and communication device 710b is connected to input port 712a2. Communications devices 710c and 710d are connected to input ports 712b1 and 712b2, respectively, of switch 712b. Communication devices 710e, 710f, 710g, and 710h are connected to input ports 712c1, 712c2, 712d1, and 712d2, respectively, of crossbar switches 712c and d. The output ports of switches 712a and 712b are connected to input ports of a stride extender coupler module 714a, and the output ports of crossbar switches 712c and 712d are coupled to input ports of a second stride extender coupler module 714b of a first interconnection stage 724.

Output ports of stride extender coupler modules 714a and 714b of first interconnection stage 724 are coupled to input ports (716a1, 716a2); (716b1, 716b2); (716c1, 716c2); and 716d1, 716d2 of switches 716a, 716b, 716c and 716d, respectively, of a second stage 726 of switches. Output ports (716a3, 716a4); (716b3, 716b4); (716c3, 716c4); (716d3, 716d4) of switches 716a, 716b, 716c and 716d, respectively, of second switch stage 726, are connected to input ports of stride extender coupler modules 718aa and 718ab of a substage 728a of a second stage 728. Output ports of stride extender coupler modules 718aa and 718ab of first substage 728a of second coupler stage 728 are coupled to input ports of stride extender coupler modules 718ba and 718bb, respectively, of a second substage 728b of second coupler stage 728. Output ports of stride extender coupler modules 178ba and 718bb of second substage 728b of second coupler stage 728 are connected to input ports of stride extender coupler modules 718ca and 718cb, respectively, of third substage 728c of second interconnecting stage 728. The stride extender coupler modules 714 and 718 of the network of FIG. 7a are all mutually identical. Output ports of stride extender coupler modules 718ca and 718cb of third substage 728c of second interconnection stage 728 are connected to ports of mutually identical terminating or terminal coupler modules 720a and 720b, respectively, of a termination stage 730.

Figure 7B:
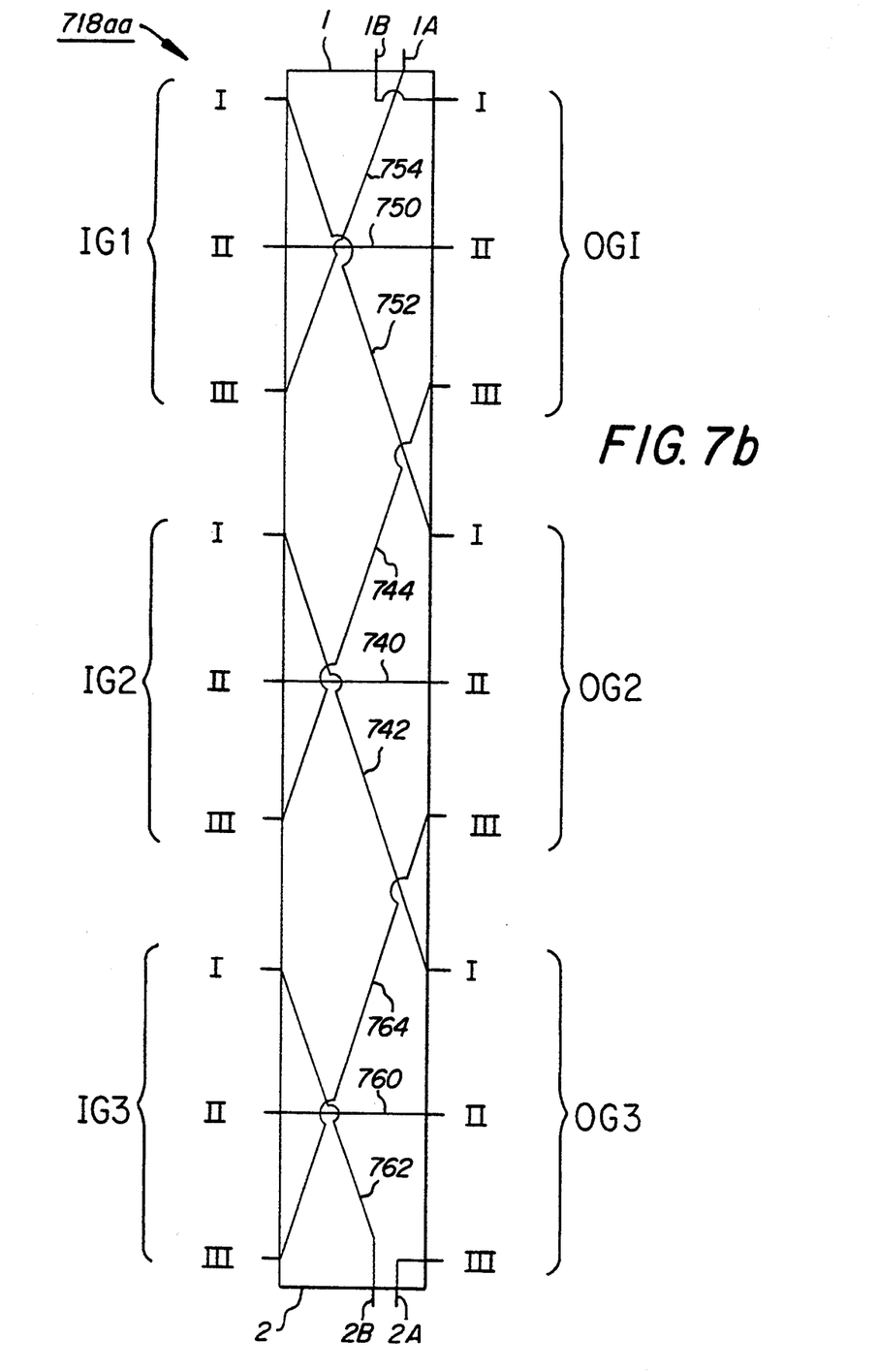

FIG. 7b is a schematic/layout diagram of a coupler module 718 of FIG. 7a. For definiteness, FIG. 7b represents stride extender coupler module 718aa of FIG. 7a. In FIG. 7b, stride extender coupler module 718aa is illustrated as having nine "input" ports on the left, grouped in threes into groups IG1, IG2, and IG3. Nine "output" ports on the right are grouped in threes into groups OG1, OG2, and OG3. As illustrated in FIG. 7b, the ports of each group are designated with the roman numeral I, II or III, with the lowest numeral (I) corresponding to that port of each group which is nearest an end 1 of the module, and the port designated III nearest an opposite end 2 of the module. Within, the module, individual connections of input ports to output ports are made by conductors, which provide bidirectional signal flow between the ports. In general, the second input port of a group, such as input port II of group IG2, is connected by a conductor, such as 740 of FIG. 7b, to the second output port II of the corresponding group OG2 of output ports. the first input port of that group of input ports (IG2) is connected by a conductor, such as 742, to the first output port (I) of the following adjacent group, such as OG3. The third input port III of the group IG2 is connected by a conductor 744 to the third output port III of the preceding adjacent group OG1. The described pattern is repeated for all groups of ports which are not adjacent the end groups of the module. In the particular case of module 718aa of FIG. 7b, there is only one such interior group, i.e. IG2 (input) and OG2 (output), and the other two groups are end groups. Insofar as the connection of the end group can follow the abovementioned rules without connections leaving the module, those general rules apply. For example, the second input port II of first input port group IG1 is connected to the second output port II of the first output port group OG1 by a conductor 750. First input port I of first input port group IG1 is connected by a conductor 752 to the first output port I of the following adjacent output port group OG2. However, applying the general rule to input port III of first input port group IG1, it should be connected to the last output port of the group preceding group 1, which does not exist within the module. According to an aspect of the invention, input port III of first input port group IG1 is coupled by a conductor 754 to an end 1 auxiliary port 1A, which as described below ultimately connects with the last output port of the preceding stride extender module. Referring to last input port group IG3 of FIG. 7b, input port II is coupled to output port II of last output port group OG3 by a conductor 760. Last input port III of input port group IG3 is connected by a conductor 764 to the last output port III of the preceding group of output ports OG2. when the general rule is applied to input port I of last input port group IG3, the connection is required to be made to the first output port of the first output port of the next following output port group, which does not exist on the module. According to an aspect of the invention, first input port I of last input port group IG3 is connected by a conductor 762 to an end 2 auxiliary port 2B. The internal connections are completed by connecting output port I of the first group of output ports OG1 to an auxiliary port 1B, which mates with auxiliary port 2B of the next preceding module (not illustrated in FIG. 7b), to achieve the desired connections. Similarly, last output port III of last group of output ports OG3 is connected to an auxiliary port 2A, which mates with a corresponding port 1A of the next following module (not illustrated). Thus, the stride extender coupler module of FIG. 7b can be stacked end-to-end to form a stack of any length, which will replicate the described connections as many times as desired. As described below, such modules, when cascaded and terminated, result in the desired MSSN interconnection network, which can be expanded simply by adding additional modules.

Figure 7C:
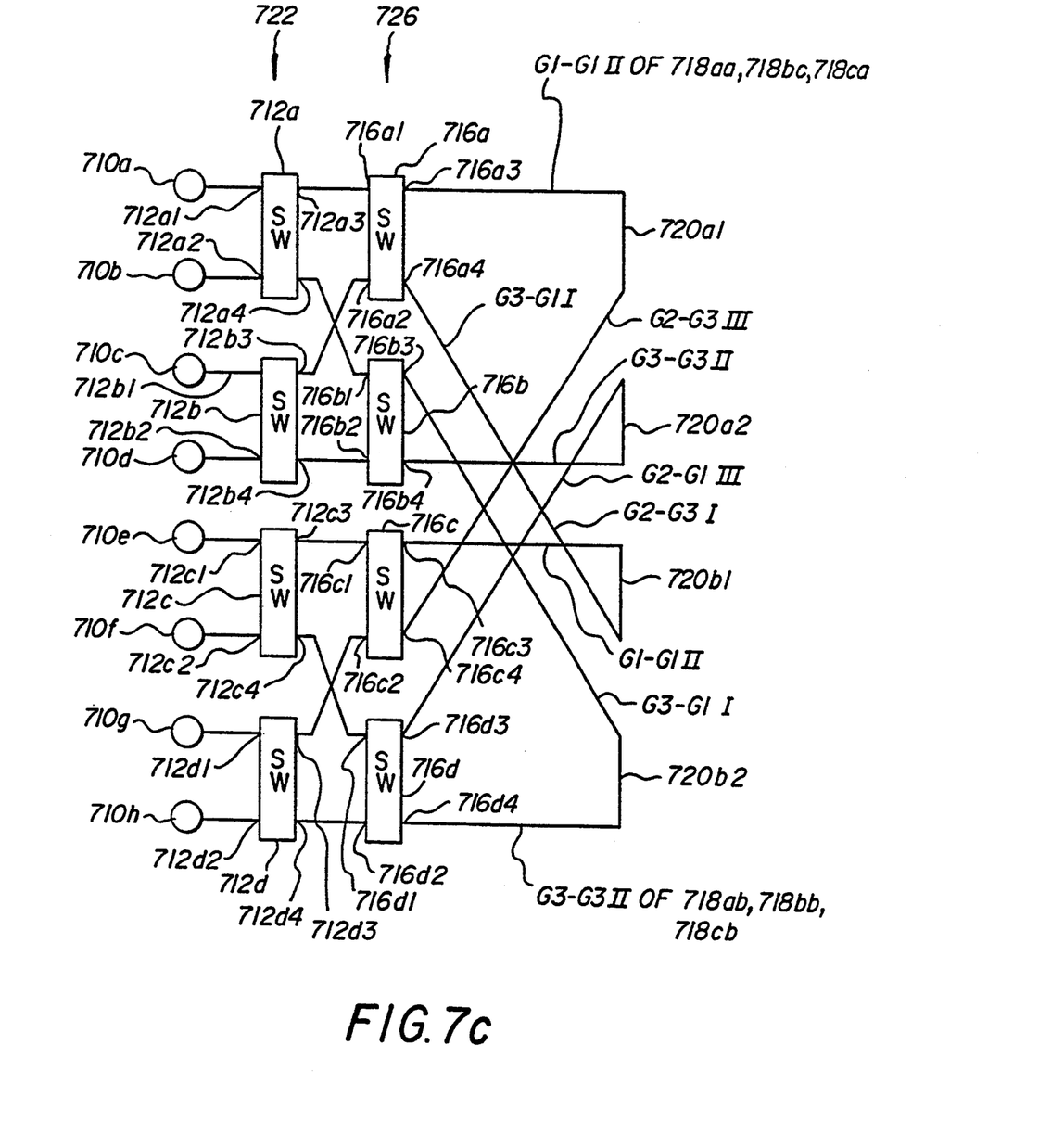
FIG. 7c is its topological equivalent.

FIG. 7c illustrates the topology of the network of FIG. 7a in simplified form. Elements of FIG. 7c corresponding to those of FIGS. 7a and 7b are designated by the same reference numerals. Referring to FIGS. 7a, 7b and 7c, port 716a3 is connected to port 716c4 by a data path including (a) the path connecting input port II of input port group IG1 of stride extender 718aa to output port II of output port group OG1 of stride extender coupler module 718aa, (b) the path connecting input port II of input port group IG1 of stride extender coupler module 718ba to its output port II of OG1, (c) the path connecting input port II of input port group IG1 of stride extender coupler module 718ca to its output port II of group OG1, (d) a "termination" path 720a1, (e) the path between output port III of output port group OG1 of stride extender coupler module 718ca and input port III of input port group IG2, (f) the path between output port III of output port group OG2 of stride extender coupler module 718ba and input port III of input port group IG3, (g) the path extending between output port III of output port group OG3 of stride extender coupler module 718aa and its coupling port 2a, (h) the path extending between coupling port 1A of stride extender coupler module 718ab and input port III of input port group IG1. Connections are made in a similar manner between output port 716a4 of switch 716a and output port 716c3 of switch 716c, between output port 716b3 of switch 716b and output port 716d4 of switch 716d, and between output port 716b4 of switch 716b and output port 716d3 of switch 716d.

Figure 8A:
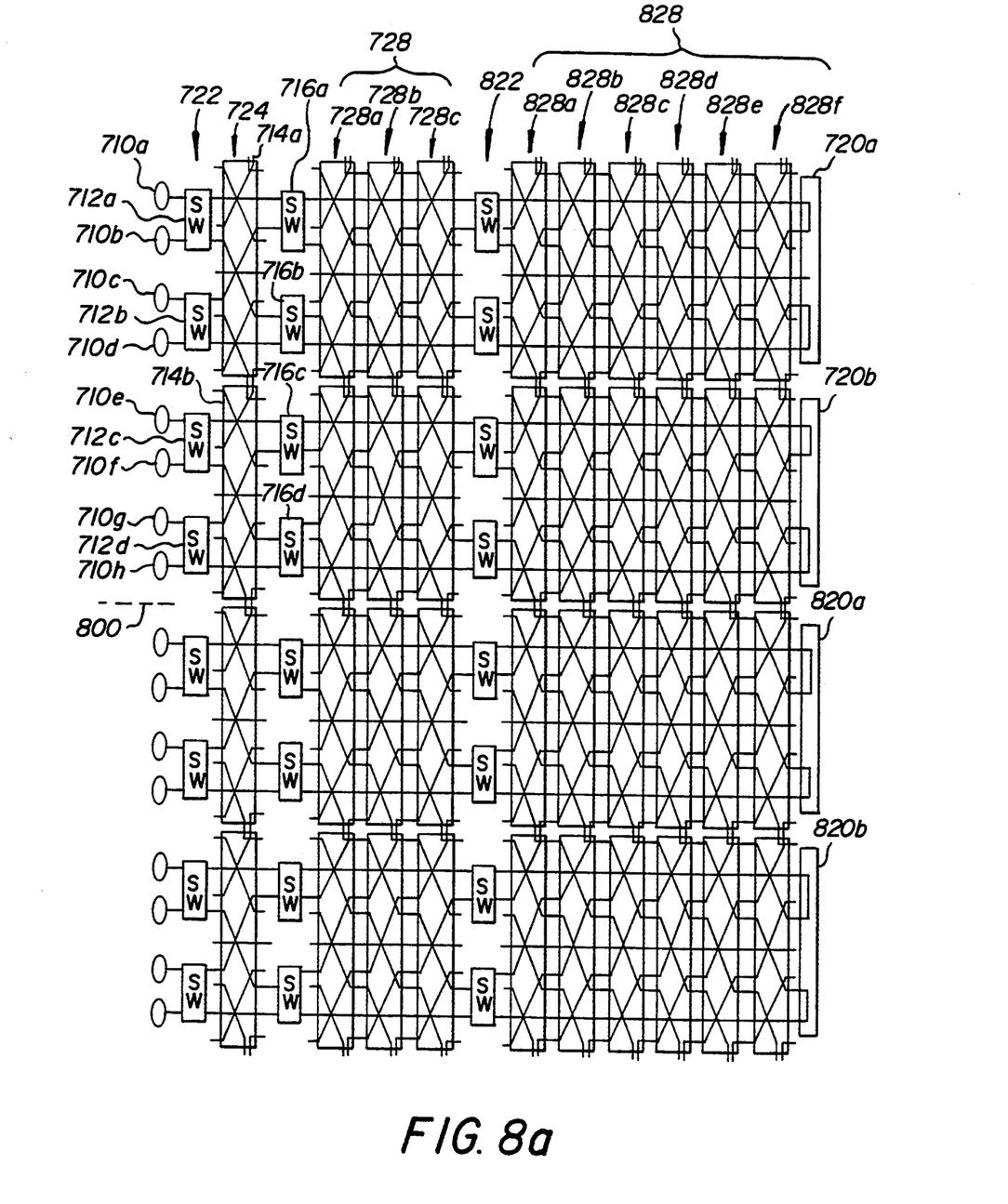
FIG. 8a illustrates the communications network of FIG. 7a expanded by the addition of stages of crossbar switches and stride extenders.
Figure 8B:
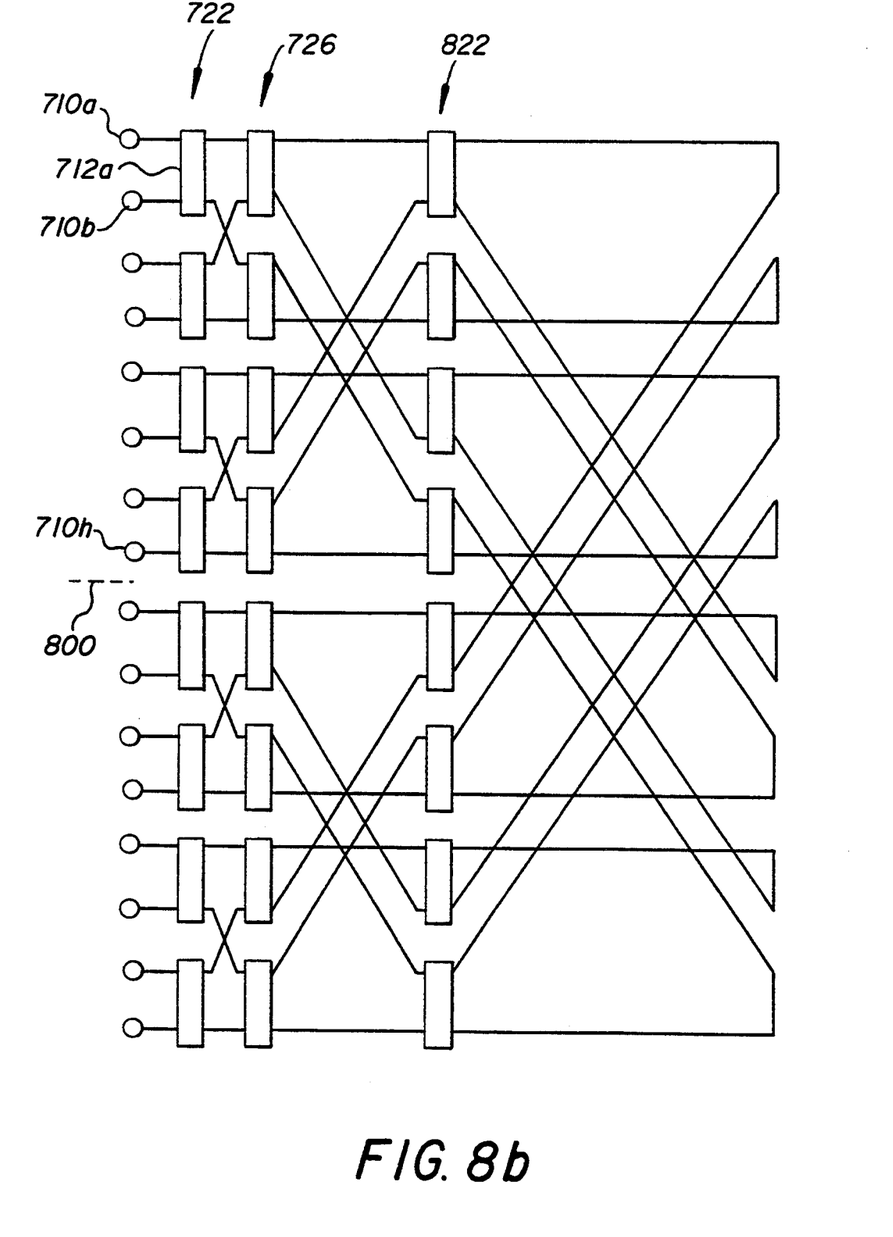
FIG. 8b is its topological equivalent.
Figure 9:
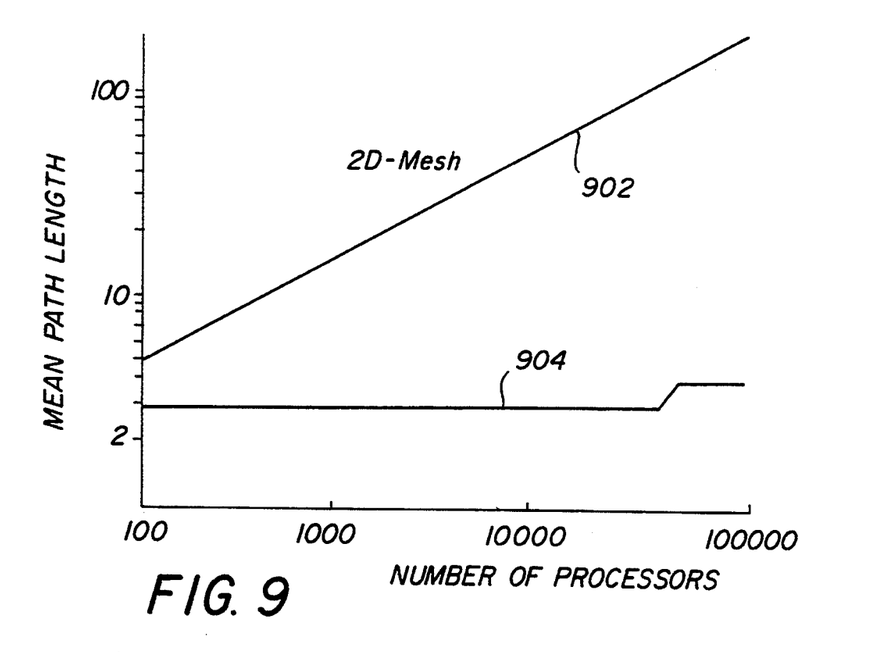
FIG. 9 is a plot of communication latency versus system size for a multistage switch network according to the invention and for a prior-art 2-d mesh network.

FIGS. 8a and 8b illustrate how the network of FIGS. 7a and 7c can be expanded by simple addition of further stride extender coupler modules identical to those used in the network of FIGS. 7a, 7c, and described in conjunction with FIG. 7b. the upper and lower halves of the network of FIG. 8a are each identical to the network of FIG. 7a, with the A and B ports of the adjacent stride extender coupler modules of the two halves interconnected. The network of FIG. 7a interconnects eight processors by means of two stages of crossbar switches and four stags of stride extender coupler modules, which can be expanded by adding a third stage of crossbar switches and fifth through tenth stags of stride extender coupler modules to handle sixteen processors. Further expansions can be achieved by removing the four terminating modules from the network of FIG. 8a, providing a second such network, adding a further stage (a fourth stage) of crossbar switches in place of the termination modules, adding a further set of eighteen stages of stride extender coupler modules, replacing the four termination modules, and adding four additional termination modules.

The number of stages S of crossbar switches is given by the equation $$S = \tfrac{1}{2} \log_m(N) \qquad (1)$$

where
 m is the crossbar dimension (the number of input ports), and
 N is the number of computational entities to be connected.

Thus, in FIG. 7a, N is eight, m is two, so $$S = \tfrac{1}{2} \log^8 2 \qquad (2)$$

$$S = (\log^2 10)/2 = 3/2 \qquad (3)$$

which must be rounded up to 2, corresponding to two stages of crossbar switches. Similarly, in FIG. 8a, N is sixteen and m is two, so $$S = (\log^{16} 10/\log^2 10)/2 = 2 \qquad (4)$$

Figure 10:
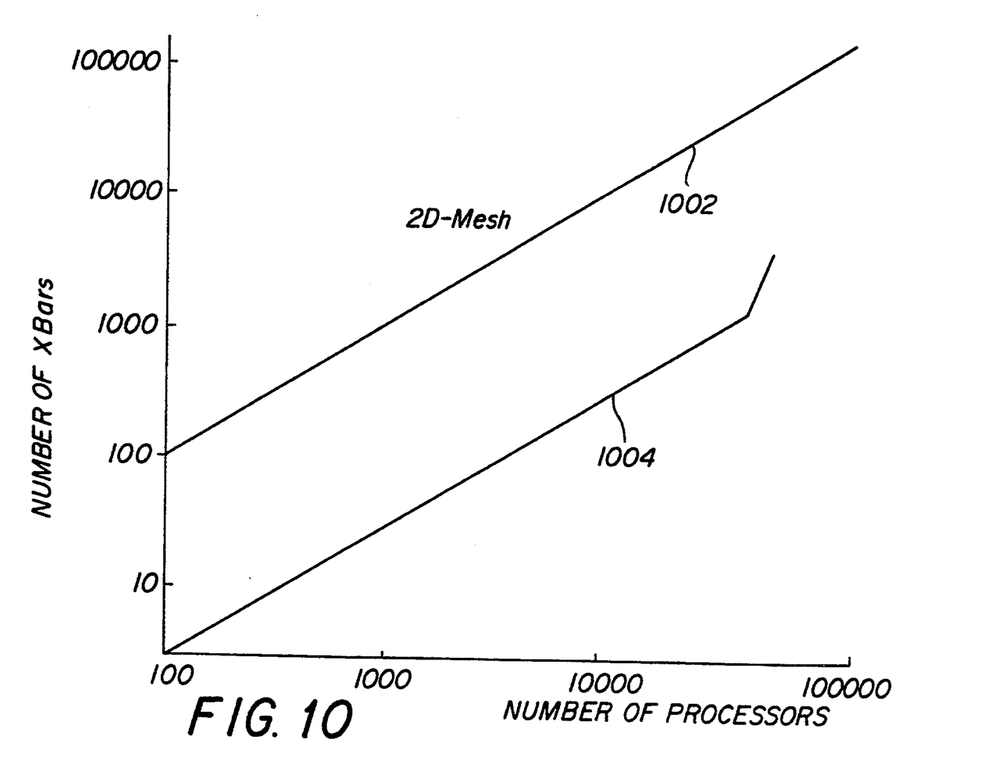
FIG. 10 is a plot of relative realization cost versus system size for an MSSN network according to the invention and for a prior-art 2d-mesh.

FIG. 10 is a plot of realization cost (construction cost), measured by the number of crossbar (xbar) switches, as a function of network size, measured in the number of interconnected processors. In FIG. 10, plot 1002 represents a prior-art 2-d mesh arrangement, and plot 1004 represents a communications system or network according to the invention. As illustrated, the cost of a network according to the invention is well below that of a 2-d crossbar switch.

Other embodiments of the invention will be apparent to those skilled in the art. While digitally operated processors have been described, analog systems or trinary systems may use the same topology and structure. The linkages and switches may be electrical, optical or other. While the arrangement of FIGS. 7a and 7b illustrates stride extender coupler modules with three groups of input and output ports, each module may include additional groups of ports. While the connections among ports of the stride extender modules have been described as being made by simple conductors, a grouping of active circuits providing equivalent bidirectional signal flow will provide the desired performance.

What is claimed is:

1. An expandable communications system, said system comprising:

a plurality of communication devices;

a first stage including a first plurality of mutually identical crossbar switches, each of said crossbar switches including a plurality of input ports and a plurality of output ports, each of which input ports is coupled to one of said communication devices;

a second stage including a second plurality, less than said first plurality, of mutually identical stride extender coupler modules, each of said stride extender coupler modules including input ports, at least some of which are fixedly coupled to said output ports of said crossbar switches of said first stage, and also including output ports;

a third stage including a plurality, equal to said first plurality, of crossbar switches, each of which is identical to one of said crossbar switches of said first stage, each of said crossbar switches of said third stage having its input ports fixedly coupled to at least some of said output ports of at least one of said stride extender coupler modules of said second stage;

a fourth stage of stride extender coupler modules, each of said stride extender coupler modules of said fourth stage being identical to one of said stride extender coupler modules of said second stage, said fourth stage of stride extender coupler modules including a plurality of substages of said stride extender coupler modules including a first substage of stride extender coupler modules including output ports, and also having input ports fixedly coupled to output ports of said crossbar switches of said third stage, a last substage of stride extender coupler modules including input ports and output ports, and intersubstage coupling means for fixedly coupling said input ports of said stride extender coupler modules of said last substage to said output ports of said first substage of stride extender coupler modules; and a stage of termination modules fixedly coupled to at least some of said output ports of said stride extender coupler modules of said last substage of said fourth stage, 2. A system according to claim 1, wherein:

said intersubstage coupling means comprises at least one additional substage of stride extender coupler modules, each identical to a stride extender coupler of one of said first and last substage of said fourth stage, said at least one additional substage of stride extender coupler modules including input ports fixedly coupled to said output ports of said first substage of stride extender coupler modules, and also including output ports fixedly coupled to said input ports of said last substage of stride extender coupler modules.

3. A communications interconnection arrangement for interconnecting a plurality of communication devices, any pairs of which may be interconnected for communications therebetween, said arrangement comprising:

a first plurality of bidirectional M×M first crossbar switches, each including, for a particular direction of signal flow, M input ports and M output ports, each input port of at least a subset of said M input ports being coupled to one of said communication devices, and said M output ports being arrayed in a line, with a predetermined spacing therebetween;

a second plurality of N×N bidirectional stride extender coupler modules, where N is greater than M, said second plurality being less than said first plurality, each of said stride extender coupler modules including, for said particular direction of signal flow, N input ports and N output ports, said input ports of each of said stride extender coupler modules including a first input port adjacent a first end of said module and a last input port adjacent a second end of said module, opposite to said first end, said output ports of each of said stride extender coupler modules including a first output port adjacent said first end of said module and a last output port adjacent said second end of said module, said N input ports of said stride extender coupler modules being arrayed in a line extending from said first input port to said last input port, with said predetermined spacing therebetween, and said N output ports being arrayed in a line extending from said first output port to said last output port, with said predetermined spacing therebetween, said first input ports of each of said stride extender coupler modules being connected for signal flow with the third output port of said module, the second input port of each of said stride extender coupler modules being connected for signal flow with the second output port of said module, and the third input port of each of said stride extender modules being connected for signal flow with said first output port of said module, to thereby form said first, second and third input ports into a group of three, and said first, second and third output ports into another group of three, said last input port of each of said stride extender coupler modules being coupled for signal flow with an antepenultimate output port of said module, a penultimate input port of each of said stride extender coupler modules being connected for signal flow with a penultimate output port of said module, an antepenultimate input port of each of said stride extender coupler modules being connected for signal flow with said last output port of said module, to thereby form said antepenultimate, penultimate and last input ports into a group of three, and said antepenultimate, penultimate and last output ports into another group of three, those input ports of each of said stride extender coupler modules lying between said third input port and said antepenultimate input port being grouped in threes, each of said groups of three including a primary input port lying nearest said first end of said stride extender coupler module, a tertiary input port lying nearest said second end of said stride extender coupler module, and a secondary input port lying between said primary and tertiary input ports of said stride extender coupler module, those output ports of each of said stride extender coupler modules lying between said third and said antepenultimate output ports being grouped in threes, each of said groups of three including a primary output port lying nearest said first end of said stride extender coupler module, a tertiary output port lying nearest said second end of said stride extender coupler module, and a secondary output port lying between said primary and tertiary output ports of each of said groups of three output ports, said secondary input port of each one of said groups of three input ports being coupled to said second output port of a corresponding one of said groups of three output ports, said primary input port of said one of said groups of three input ports being coupled to said primary output port of one of two groups of three output ports which is adjacent to said corresponding one of said groups of three output ports, and said tertiary input port of said one of said groups of three input ports being coupled to said tertiary output port of the other one of said two groups of the output ports which is adjacent to said corresponding one of said groups of three output ports, at least some of said N input ports of each of said stride extender coupler modules of said second plurality of stride extender coupler modules being individually coupled to corresponding ones of said M output ports of said first crossbar switches;

a third plurality of bidirectional $P \times P$ second crossbar switches, where P is less than N, each of said second crossbar switches including, for said particular direction of signal flow, P input ports and P output ports, at least some of said input ports of said second crossbar switches being individually coupled to output ports of said stride extender coupler modules of said second plurality of stride extender coupler modules;

a fourth plurality, at least as great as said second plurality, of $N \times N$ bidirectional stride extender coupler modules identical to said bidirectional stride extender modules of said second plurality, at least some of said input ports of said bidirectional stride extender modules of said fourth plurality being individually coupled to output ports of said second crossbar switches; and a fifth plurality, equal to said fourth plurality, of termination modules, each of said termination modules including a plurality of ports, equal in number to the number of output ports of each of said stride extender coupler modules, said ports of each of said termination modules being arranged in a line and separated by said predetermined spacing, said ports of said termination modules including first, second, third, antepenultimate, penultimate, and last ports, positioned on said termination module in a manner corresponding to the positioning of corresponding port on said stride extender coupler modules, said termination modules also including further ports lying between said third and antepenultimate ports, said further ports of said termination module being grouped in threes, with primary, secondary and tertiary ports in each group of three, positioned in a manner corresponding to said primary, secondary and tertiary ports of said stride extender coupler modules, each of said termination modules including at least one signal path extending from one of said secondary ports of one of said groups of three ports to one of the primary and tertiary ports of an adjacent one of said groups of three ports.

* * * * *